United States Patent
Wilson

(10) Patent No.: US 10,114,237 B2
(45) Date of Patent: Oct. 30, 2018

(54) SURFACES WITH PHOTONIC CRYSTAL COATINGS AND METHODS OF CUSTOMIZING THE VISUAL APPEARANCE THEREOF

(71) Applicant: Apple Inc., Cupertino, CA (US)

(72) Inventor: James R. Wilson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/483,384

(22) Filed: Apr. 10, 2017

(65) Prior Publication Data

US 2018/0059443 A1 Mar. 1, 2018

Related U.S. Application Data

(60) Provisional application No. 62/380,523, filed on Aug. 29, 2016.

(51) Int. Cl.
*G02F 1/01* (2006.01)
*G02F 1/00* (2006.01)
*G02F 1/09* (2006.01)

(52) U.S. Cl.
CPC .......... *G02F 1/0126* (2013.01); *G02F 1/0036* (2013.01); *G02F 1/09* (2013.01); *G02F 2202/32* (2013.01)

(58) Field of Classification Search
CPC ... G02F 1/0126; G02F 2203/10; B82Y 20/00; G02B 26/02; G02B 5/23
USPC ........................................................ 351/244
See application file for complete search history.

(56) References Cited

U.S. PATENT DOCUMENTS

| | | | |
|---|---|---|---|
| 6,813,094 B2 | 11/2004 | Kaminsky et al. | |
| 6,842,282 B2 | 1/2005 | Kuroda et al. | |
| 7,760,424 B2 | 7/2010 | Takeuchi et al. | |
| 7,924,368 B2 | 4/2011 | Fabick et al. | |
| 8,009,351 B2 | 8/2011 | Ando et al. | |
| 8,384,630 B2 * | 2/2013 | Ray ........................ | B82Y 20/00 257/80 |
| 9,030,736 B2 | 5/2015 | Sadahiro et al. | |
| 9,081,171 B2 | 7/2015 | Dean et al. | |
| 2003/0017316 A1 | 1/2003 | Pfaff et al. | |
| 2004/0104663 A1 | 6/2004 | Umeya et al. | |
| 2007/0103799 A1 | 5/2007 | Chiang et al. | |

(Continued)

FOREIGN PATENT DOCUMENTS

| | | |
|---|---|---|
| CN | 101124273 | 2/2008 |
| CN | 102308231 | 1/2012 |

(Continued)

OTHER PUBLICATIONS

Eiden-Assmann et al., "Synthesis and Characterization of Porous and Nonporous Monodisperse Colloidal $TiO_2$ Particles," *Chem. Mater.*, 2004, vol. 16, pp. 6-11.
Wang et al, "Rapid Microwave Synthesis of Porous $TiO_2$ Spheres and Their Applications in Dye-Sensitized Solar Cells," *The Journal of Physical Chemistry*, 2011, vol. 115, pp. 10419-10425.

(Continued)

*Primary Examiner* — Mohammed Hasan
(74) *Attorney, Agent, or Firm* — Polsinelli PC

(57) ABSTRACT

Substrates having structured optical appearances are disclosed. The substrate can include a surface having a photonic crystal coating disposed on the surface. The photonic crystal coating comprising capsules, each capsule comprising particles disposed in a medium and the particles are configured to align in an order array upon application of an electromagnetic field.

20 Claims, 11 Drawing Sheets

(56) References Cited

U.S. PATENT DOCUMENTS

| | | |
|---|---|---|
| 2010/0330331 A1 | 12/2010 | Chiang et al. |
| 2012/0188295 A1* | 7/2012 | Joo .................. G02F 1/167 345/690 |
| 2012/0218653 A1 | 8/2012 | Liu et al. |
| 2013/0133739 A1 | 5/2013 | Kohnke et al. |
| 2013/0194668 A1 | 8/2013 | Liang et al. |
| 2014/0178647 A1 | 6/2014 | Kim et al. |
| 2014/0233161 A1 | 8/2014 | Liu |
| 2014/0295127 A1 | 10/2014 | Tang et al. |
| 2015/0062709 A1 | 3/2015 | Matsuyuki et al. |
| 2015/0234098 A1 | 8/2015 | Lofftus et al. |
| 2016/0377768 A1 | 12/2016 | Wilson et al. |
| 2017/0068021 A1 | 3/2017 | Wilson |
| 2017/0075386 A1 | 3/2017 | Park |
| 2017/0090084 A1 | 3/2017 | Wilson et al. |
| 2017/0174565 A1 | 6/2017 | Kase et al. |
| 2018/0057693 A1 | 3/2018 | Wilson |

FOREIGN PATENT DOCUMENTS

| | | |
|---|---|---|
| DE | 102012109808 | 6/2014 |
| EP | 1170618 | 1/2002 |
| JP | 2002-240423 | 8/2002 |
| KR | 10-2013-0123000 | 11/2013 |
| KR | 101336936 | 12/2013 |
| WO | WO 01/03945 | 1/2001 |
| WO | WO 2010/096914 | 9/2010 |
| WO | WO 2015/086858 | 6/2015 |
| WO | WO 2016/006538 | 1/2016 |

OTHER PUBLICATIONS

Lou et al., "The Fabrication of TiO2 Porous Ceramic Structure," Journal of Shanghai Jiaotong University, No. 2, 314, Dec. 2007, pp. 306-309.

* cited by examiner

SURFACES WITH PHOTONIC CRYSTAL COATINGS AND METHODS OF CUSTOMIZING THE VISUAL APPEARANCE THEREOF

CROSS-REFERENCE TO RELATED PATENT APPLICATION

This patent application claims the benefit of U.S. Patent Application Ser. No. 62/380,523, entitled "Surfaces with Photonic Crystal Coatings and Methods of Customizing the Visual Appearance Thereof," filed on Aug. 29, 2016 under 35 U.S.C. § 119(e), which is incorporated herein by reference in its entirety.

FIELD

The described embodiments relate generally to surfaces having structured optical appearances. More particularly, the embodiments relate to adjusting the visual appearance of a surface by using physical structures that create optical interference effects to change the color, opacity, and/or haze of a surface rather than chemical alteration through the use of dyes or pigments.

BACKGROUND

Structural color is observed in nature and has many characteristics that differ from those of chemical pigments or dyes. Typically color is due to light absorption, but structural color can both refract and reflect light. For example, ordered structural color/photonic crystals operate by reflecting light.

Owing to these characteristics, there have been attempts to make artificial structural color through various technological approaches such as colloidal crystallization, dielectric layer stacking, and direct lithographic patterning. The colloidal crystallization technique is used to make a photonic crystal, which reflects a specific wavelength of light in the crystal and therefore displays the corresponding color.

Structural colored surfaces can provide for customizing the visual appearances of articles of manufacture. Structural colored surfaces can also provide for adaptability and/or tunability to effect the visual appearance of a substrate.

SUMMARY

In various aspects, the disclosure is directed to surfaces having structured optical appearances.

In one aspect, the disclosure is directed to a surface having a structured optical appearance comprising a substrate, a photonic crystal coating disposed on the substrate, the photonic crystal coating comprising capsules, each capsule comprising particles disposed in a medium. The particles are configured to align in an ordered array upon application of an electromagnetic field. In certain variations, the substrate is a glass, a metal, a polymer. In certain variations, the capsule is a glass, or a polymer. In certain variations, the particles are a magnetic material, ferroelectric material, or a dielectric material.

In another aspect, the disclosure is directed to a method of creating or customizing a visual appearance of a surface of a substrate. In some embodiments, the method includes applying a photonic crystal coating to at least a portion of a surface of the substrate. The photonic crystal coating comprises particles embedded in a curable carrier medium within in capsules. The particles are configured to align in an ordered array upon application of an electromagnetic field. A portion of the photonic crystal coating to the electromagnetic field to cause the particles to align in the ordered array such that the portion of the photonic crystal coating appears as a selected color. The curable carrier medium in the capsules can be cured to retain the selected color after the electromagnetic field is removed. In some variations, the curing step includes selectively applying a laser (e.g., a UV laser) to the portion of the photonic crystal. In other variations, the steps of exposing and curing are repeated successively to create two or more colors. In some variations, different electromagnetic fields can be applied to different portions of the photonic crystal prior to curing the surface. Alternatively, multiple curing steps can be employed. In some instances, the steps of exposing and curing are repeated successively. Curing using a UV laser can provide very close control of a created image, as curing can be controlled down to the width of a focused laser (e.g., a UV laser).

In another aspect, the disclosure is directed to a method of dynamically changing a visual appearance of a portion of a substrate. The method includes applying a photonic crystal coating to at least a portion of a surface of the substrate having a first color, wherein the photonic crystal coating comprises particles disposed in capsules and wherein the particles are configured to align in an ordered array upon application of an electromagnetic field and exposing a portion of the photonic crystal coating to the electromagnetic field to cause the particles to align in the ordered array such that the photonic crystal coating appears as a second color. Further, when the electromagnetic field is removed the particles to move out of the ordered array such that the photonic crystal coating appears as the first color.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to methods of creating and using structural color to affect the visual appearance of a surface of a substrate. According to embodiments of the disclosure, photonic crystal coating can be applied to surfaces of substrates to customize and/or tune the visual appearance thereof. In some embodiments, the creation or customization of the visual appearance of surfaces of substrates can be static, while in other embodiments, the visual appearance may be dynamic. In some embodiments, a photonic crystal coating can be applied to a surface of an article to create tunable visual appearances, meaning that the visual appearance of the surface can be designed to have a specific color, pattern, design, drawing, photograph, or other pixelated image. In some embodiments, the tunability of the surface having a structured optical appearance may be used to change the visual appearance based on a consumer preference. In other embodiments the tunability of the surface having a structured optical appearance may be used to change the visual appearance to act as a notification system to alert an observer.

The disclosure relates to substrates and methods of adjusting the visual surface by manipulating a layer of photonic crystals. The photonic crystals comprise capsules with embedded particles. When the embedded particles form an ordered array with a specific periodicity, they have the effect of changing the color of the surface in response to the electromagnetic field. The disclosure is also directed to methods of adjusting the visual appearance of a surface by applying a layer of photonic crystals.

In some aspects, the substrate with the photonic crystal coating can be exposed to a specific electromagnetic field to create or customize the visual appearance of the substrate according to a preference. The photonic crystal coating or layer can be used to create a specific color, pattern, design, drawing, photograph, or other image by reflecting selected wavelengths of light without the use of pigments or dyes.

These and other embodiments are discussed below with reference to FIGS. 1-5. However, those skilled in the art will readily appreciate that the detailed description given herein with respect to these figures is for explanatory purposes only and should not be construed as limiting.

Figure 1A:
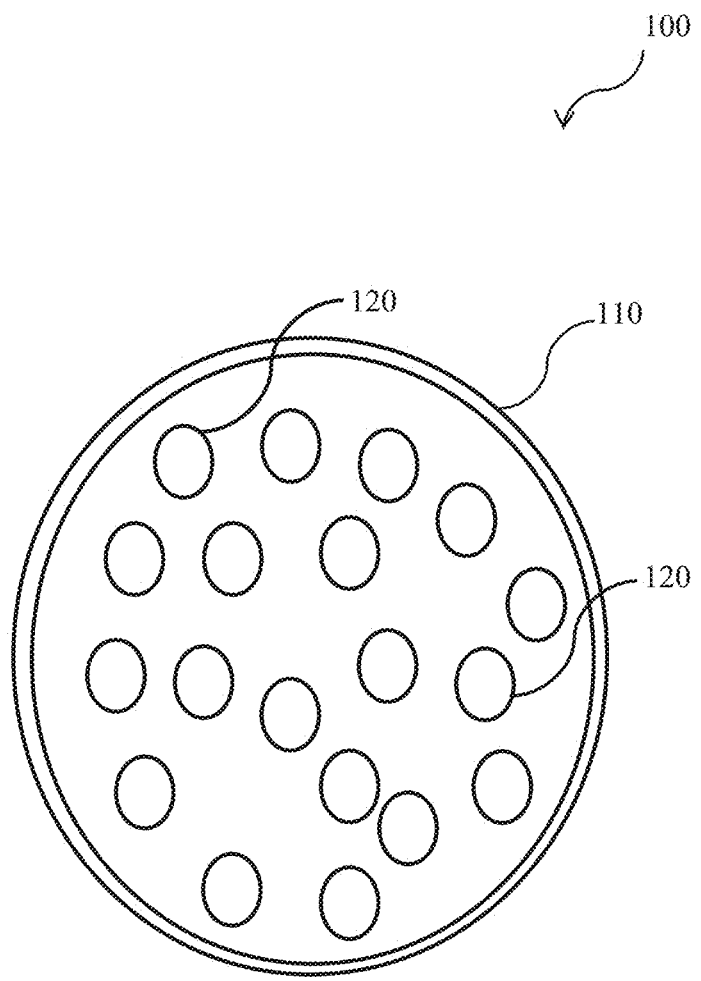
FIG. 1A shows a photonic crystal with particles in a randomized arrangement, in accordance with embodiments of the disclosure.
Figure 1B:
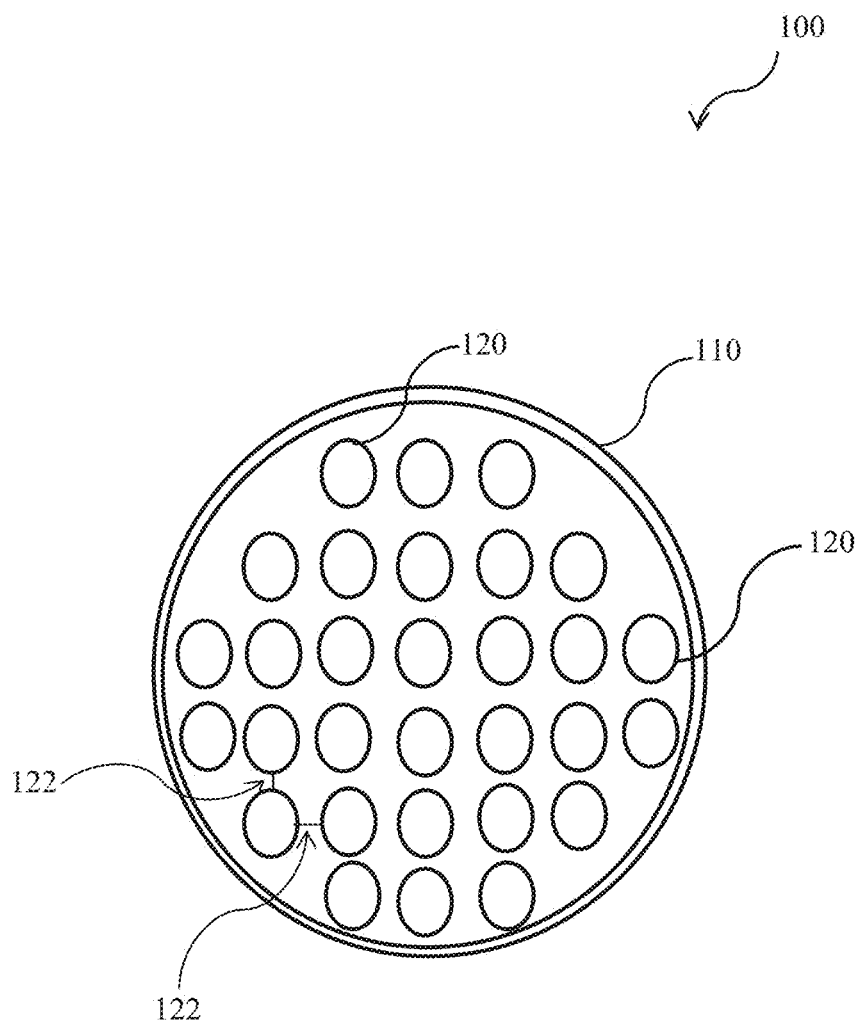
FIG. 1B shows the photonic crystal of FIG. 1A with the particles in an ordered arrangement, in accordance with embodiments of the disclosure.

In one aspect, the dynamic and/or customizable color can be created by using photonic crystals. In such embodiments, as illustrated in FIG. 1A-1B, particles can be embedded within the capsules. The visual appearance of a surface of the substrate can be altered by using the photonic crystals to create optical interference effects between transmitted waves of light such that the color of the surface observed by a viewer can be altered. FIGS. 1A and 1B illustrate an exemplary photonic crystal 100. As shown, photonic crystal 100 comprises capsule 110 with particles 120 embedded in a medium. The capsule 110 and the embedded particles 120 have different indices of refraction. As such, the array of embedded particles 120 within the capsules 110 act as a tunable photonic crystal.

On application of a stimulus, such an electric or magnetic field, particles 120 can be arranged to have a periodic order with a selected spacing between adjacent particles 120. A selected wavelength of light is reflected back to an observer due to the particle periodicity that creates a photonic band gap. This principle of a photonic band gap allows for tuning the photonic crystal coating to appear as selected colors and is discussed in more detail below.

In aspects in which the particles are subject to an electric or magnetic charge, the particles 120 have some degree of charge, magnetism, or combination of both such that the particles attract or repel each other when exposed to the electromagnetic field (e.g. magnetic field, electric field, etc.). The balance between the particles' natural attractive or repulsive forces and the imposed external electromagnetic field determines the equilibrium spacing between particles. The particles thus form an ordered array (i.e. uniform spacing or gap between adjacent particles), with spacing distance that can be controlled by altering the magnitude of the external electromagnetic field. This periodicity of the particles creates the photonic band gaps. Photonic band gaps result in a specific wavelength of light being reflected, which appears as the color associated with the wavelength of light.

By way of example, the embedded particles in the capsules can be a magnetic or semi-magnetic material. FIG. 1A depicts the initial state of the embedded particles dispersed within the capsules. FIG. 1B depicts the particles moved into an ordered arrangement with a specific spacing or gap between adjacent particles within the capsules upon application of a magnetic field. A photonic band gap that reflects a selected wavelength of light within the visual spectrum is thereby created.

With respect to FIG. 1B, when an incident beam of light impacts the photonic crystal 100, certain wavelengths of the light will be absorbed, transmitted, or scattered in the gaps between the particles, while other wavelengths can be reflected. The reflected light thereby has altered the visual appearance of the surface with the photonic crystal coating.

The gap 122 between adjacent particles 120 can be any size and be selected such that a specific wavelength of light is reflected. The photonic band gap (PBG) is, essentially, the gap between adjacent particles 120. The location and size of the band gap can be designed by computational modeling so the photonic crystals 100 can be designed to appear as select colors. In general, the gap size is half the wavelength (e.g. ½λ) of the color being reflected. The visual spectrum of light ranges from about 390 nm to 700 nm and has a frequency that ranges from about 430 THz to 770 THz. Within the spectrum of visible light, red, green, and blue are considered spectral (or primary) colors, while all other colors (e.g. orange, yellow, and purple) are mixed colors. In some embodiments, gap 122 may be selected to reflect a particular wavelength that is associated with a particular color.

As such, the visual appearance of a surface having a photonic crystal coating may be adjustable. By way of example, without intending to be limiting, if it was selected that the visual preference for a surface was for a color (e.g. blue) associated with a particular wavelength of light (e.g. 490 nm), then the surface having a photonic crystal coating can be designed to reflect back that particular wavelength such that it appears as the selected color. In such instances, an electromagnetic field associated with the selected color can be applied to at least a portion of the photonic crystal coating. In response, the embedded particles will move into an ordered array having a uniform spacing or gap between adjacent particles that is ½λ of the wavelength associated with the color blue. In other words, the gap is half of 490 nm (e.g. 245 nm).

In another illustrative example, the surface having a photonic crystal coating can be designed to reflect back that particular wavelength such that it appears as the color red (e.g. 650 nm). In such instances, an electromagnetic field associated with red can be applied to at least a portion of the photonic crystal coating. In response, the embedded particles will move into an ordered array having a uniform spacing or gap between adjacent particles that is ½λ of the wavelength associated with the color red. In other words, the gap is half of 650 nm (e.g. 325 nm).

In yet another illustrative example, the surface having a photonic crystal coating can be designed to reflect back that particular wavelength such that it appears as the color green (e.g. 520 nm). In such instances, an electromagnetic field associated with green can be applied to at least a portion of the photonic crystal coating. In response, the embedded particles will move into an ordered array having a uniform spacing or gap between adjacent particles that is ½λ of the wavelength associated with the color red. In other words, the gap is half of 520 nm (e.g. 260 nm). Other possible colors and wavelengths in the visible spectrum are possible.

In some embodiments, capsule 110 can be a hollow shell and particles 120 can be embedded within the interior of the capsule. The capsule 110 can be transparent or clear. In various aspects, capsule 110 can be a glass or a polymer material. In some embodiments, the polymer can be polyurethane, polystyrene, or any other transparent polymer.

In some embodiments, the capsule can be dispersed in polymers, epoxies, inks, paints, dyes, pigments, or other suitable matrix material that can be applied as layers to the substrate. The capsules in such embodiments are of such a size to allow them to be combined into the matrix material. In some embodiments, the capsules can be 1-10 microns in size (i.e. diameter or width). In other embodiments, the capsule can be 1-25 microns in size, while in still other embodiments the capsule can be 1-50 microns in size, while in yet other embodiments the capsules can be 1-100 microns in size.

In various embodiments, the capsule 110 can contain a carrier medium 130 in which particles 120 can be embedded. In some embodiments, the carrier medium can be a Curing with UV light may be carried out for any suitable length of time. Curing can be accomplished using, for example, a UV laser to cure a small region Examples of heat curable polymers include, on the other hand, various epoxy resins such as bisphenol type, noborac type and naphthalene type epoxy resins, phenol resins, urea resins, melamine resins, polyester (unsaturated polyesters) resins, polyimide resins, silicone resins and polyurethane resins.

UV curable polymers can include a wide variety of functional groups to modify their properties for a particular application, including, for example, acetoacetyl, (meth)acryl (wherein "(meth)acryl" refers to any of methacryl, methacrylate, acryl or acrylate), vinyl, vinyl ether, (meth)allyl ether (wherein (meth)allyl ether refers to an allyl ether and a methallyl ether), or mixtures thereof. Suitable UV-curable polymers include, for example, epoxies (e.g. acrylated epoxies), acrylates, urethane acrylates, urethane methacrylates, silanes, silicones, epoxides, epoxy methacrylates, triethylene glycol diacetate, and vinyl ethers. Specific examples of these polymers include acrylated aliphatic oligomers, acrylated aromatic oligomers, acrylated epoxy monomers, acrylated epoxy oligomers, aliphatic epoxy acrylates, aliphatic urethane acrylates, aliphatic urethane methacrylates, alkyl methacrylate, amine-modified oligoether acrylates, amine-modified polyether acrylates, aromatic acid acrylate, aromatic epoxy acrylates, aromatic urethane methacrylates, butylene glycol acrylate, stearyl acrylate, cycloaliphatic epoxides, cylcohexyl methacrylate, ethylene glycol dimethacrylate, epoxy methacrylates, epoxy soy bean acrylates, glycidyl methacrylate, hexanediol dimethacrylate, isodecyl acrylate, isooctyl acrylate, oligoether acrylates, polybutadiene diacrylate, polyester acrylate monomers, polyester acrylate oligomers, polyethylene glycol dimethacrylate, stearyl methacrylate, triethylene glycol diacetate, vinyl ethers, polyurethanes, epoxies, polyamides, polyolefins (e.g. chlorinated polyolefins), acrylics, oil-modified polymers, polyesters, and mixtures or copolymers thereof.

Particles 120 respond to a stimulus in such a manner as to form a regularly repeating pattern and reflect a particular wavelength of light. The particle composition is selected such that it responds to electromagnetic fields. Suitable materials for the particles include ferro-electric materials, dielectric materials, oxides, ceramics, or other material that can form photonic band gaps.

In further embodiments, the particles can be modified to be charged or magnetized. The particles can be modified to include a charge containing moiety using any other charged species known in the art. For example, an uncharged particle can be modified, such as with a charged dispersant or surfactant (e.g. an anionic dispersant or surfactant, or a cationic dispersant or surfactant), which can be added to the particle to provide a charge. In some embodiments, the particles can be an iron oxide. In other embodiments, the particles can be $TiO_2$, ZnS, $ZrO_2$, Ge, Si, GaP, $Sb_2S_3$, $SnS_2$, CdS, and mixtures thereof. As described herein, the particles have a different index of refraction from the capsule. Further, surface of the substrate with the photonic crystal coating can have high visible transmission, or in various aspects can be visibly transparent.

The capsule and particle material have different refractive indexes. In some embodiments, the capsule may be a material with a low refractive index and the particles a material with a high refractive index, or vice versa. In some embodiments, the capsule may be a material with a first refractive index and the particles having a second refractive index. In some embodiments, the first refractive index can be lower than the second refractive index. In other embodiments, the first refractive index can be higher than the second refractive index.

As discussed above, the capsules with the embedded particles can further be dispersed within polymers, inks, paints, dyes, pigments and/or other suitable material that can be applied as coating to a substrate to alter or customize the visual appearance through the use of structural color principles. In some embodiments, the visual appearance can be altered and then lock to remain as a static appearance, while in other embodiments the visual appearance can be dynamic (e.g. change in response to an electromagnetic field and then revert make to the original color when the stimulus is removed).

The use of a photonic crystal coating to create a structural colored surface has some advantages of traditional methods of imparting color through dyes or pigments. Because no chemicals are involved with the production of color through the photonic crystal coating, the colors will not fade or lose their luminance as long as the structure is maintained. In contrast, color created by a dye or pigment can slowly degrade upon degradation of the dye or pigment.

In practice, photonic crystal coatings can be placed on a substrate. The substrate can be the visible (i.e. exterior) surfaces of a wide variety of articles of manufacture. The surfaces can be the housings or casings of articles, where the visual appearance can impact consumer selection. The articles can range in size from small personal electronic devices (e.g., smart watches, fitness trackers, cellphones, tablets, e-readers, etc.), and fashion items (e.g. footwear, hats, handbags, etc.) to large items (e.g. cars, trucks, boats, etc.). Other articles of manufacturing are possible.

Figure 2:
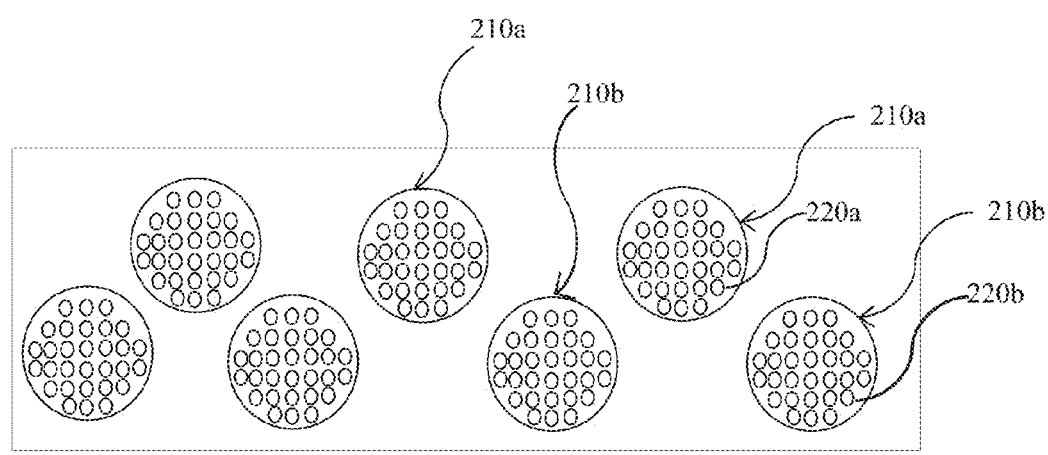
FIG. 2 shows a photonic crystal coating including a first photonic crystal and a second photonic crystal, in accordance with embodiments of the disclosure.

In other embodiments, the photonic crystal coating can include different types of photonic crystals. By way of illustration, as shown in FIG. 2, the photonic crystal coating can contain a first type of capsules 210a with first embedded particles 220a selected for a first color and a second type of capsules 210b with second embedded particles 220b selected for a second color. First embedded particles 220a can be embedded in carrier medium 212a within first type of capsules 210a, which can be a curable medium. Likewise, second embedded particles 220b can embedded in carrier medium 212b within first type of capsules 210b, which can be a curable medium. In one aspect, the first type of capsules 212a and second type of capsules 212b can be dispersed within matrix 214 in ordered arrangement in the photonic crystal coating to create a pattern or a design on the substrate. For example, the first type of capsules 210a can be designed to have a red color while the second type of capsules 210b can be designed to have a blue color when exposed to the same electromagnetic field. Other color combinations are possible. Any number of types of particles can be used to create any number of types of capsules such that the full range of colors of the visible spectrum could be reflected from the photonic crystal coating.

In some aspects, the matrix 214 can be cured. For example, matrix 214 can be heat activated, or can cure over a period of time. Matrix 214 can be cured using different curing conditions than the carrier media 212a and 212b in capsules 210a and 210b. For example, matrix 214 can include heat activated polymers that cure when exposed to heat, or can include polymers that cure over a period of time. In instance when matrix 214 is heat activated, carrier media 214a and 214b is not heat activated. As such, capsules 210a and 210b can be fixed in the cured matrix 214 before any electromagnetic field is applied. In instances where the carrier media 212a and 212b are curable, the carrier media 212a and 212b can be cured at a later time. For example, when the photonic crystal coating is exposed to an electromagnetic field to create an ordered array of particles, the carrier media can then be fixed (e.g., using a UV laser or other method as described herein).

Figure 3:
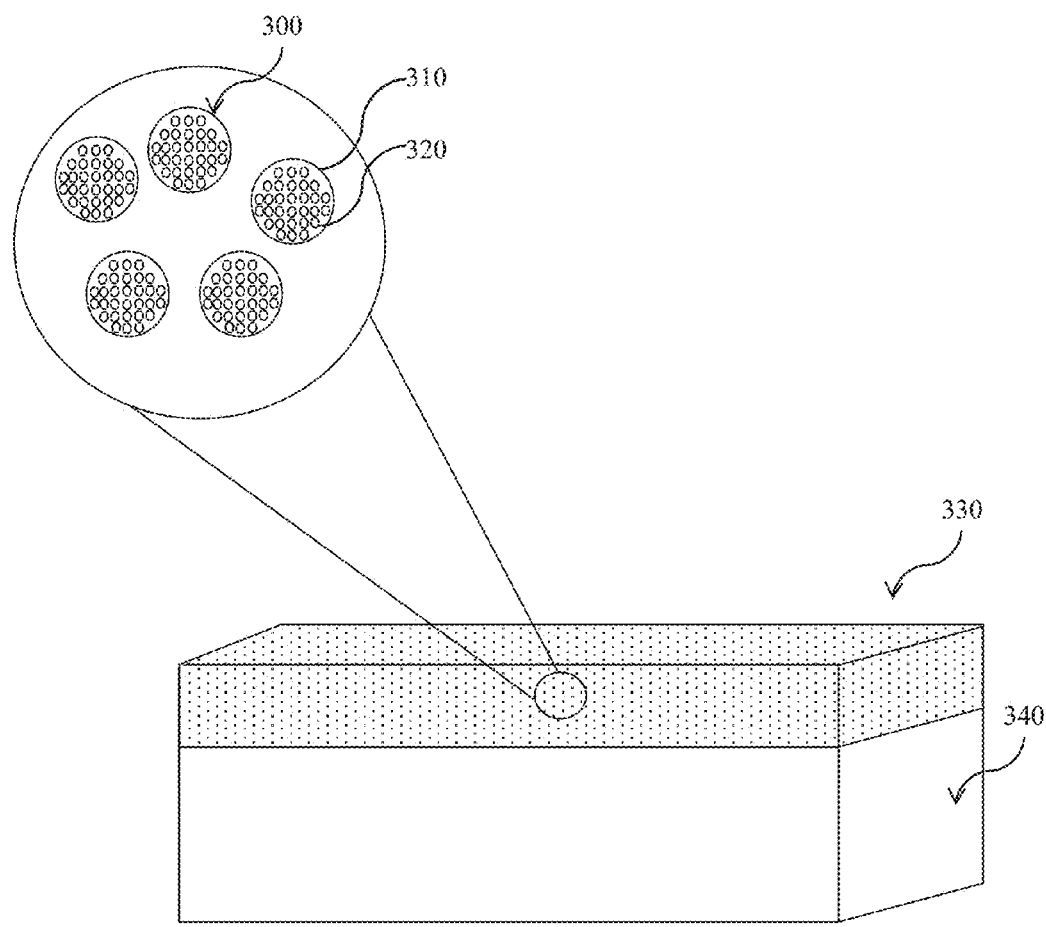
FIG. 3 shows a coating of photonic crystals applied to a surface of a substrate, in accordance with embodiments of the disclosure.

As illustrated in FIG. 3, a plurality of photonic crystals 300 can be dispersed in a coating 330 and applied to a surface 340 of a substrate. The photonic crystals 300 are analogous to photonic crystal 100 and comprise embedded particles 320 within capsules 310. Like capsule 110, capsules 310 are made from a transparent material can be a shell with a hollow interior or filed with a fluid. In embodiments including a fluid, the fluid can be any of the materials as previously described in the context of capsule 110. Particles 320 are also analogous to particle 120 and can be the any of the materials previously described.

The disclosure is also directed to methods of creating or customizing the visual appearance of surfaces of substrates. With further reference to FIG. 3, the application of the photonic crystal coating 330 to surface 340 of substrate 350 allows customization of the appearance of the substrate. Such methods involve applying photonic crystal coating and then selectively exposing the photonic crystal coating to an electromagnetic field (e.g. magnetic field, electric field, etc.) as described herein. Particles within the photonic crystals in the coating align in an ordered arrangement to create a photonic band gap such that a specific color of light is reflected.

Methods of Customizing the Appearance of a Substrate

The photonic crystal coating can be used to customize the appearance of a substrate. In various aspects, the embedded particles in the capsules within the photonic crystal coating can be selected to create a single color within the visible spectrum of light, thereby customizing the color of the substrate. By way of example, the particles can be tuned for a specific color such as violet (or any other color in the visible spectrum) such that when an environment stimulus (e.g. magnetic field) is applied to the photonic crystal coating the substrate appears as the specific color of violet. This provides a manufacturing advantage in that an article can be made in bulk quantities with an initial color. Then the photonic crystal coating allows for changing the initial color to suit a wide range of consumer preference, rather than having only a selection of stock colors or designs that are only achievable through the addition of pigments and/or dyes. Instead, each substrate can be readily customized for each individual consumer base on individual preferences.

In some embodiments, the methods can also be used to create multiple colors, patterns, designs, drawings, or any other image. Such methods can be considered a type of digital printing process.

Any image, drawing, or design can be written on the photonic crystal coating by the methods described herein.

First, a digital form of the pattern, drawing, design, photograph, or other image is needed, that defines the color target for each location on the photonic crystal coating. Then a system can be set up where a uniform magnetic field (or other electromagnetic field) can be applied to the photonic crystal coating, changing it to a specified color (e.g. red). When a UV curable medium is used to embed particles in the capsules, a UV laser can be used to cure the curable media in the capsules in regions where the UV laser is incident on the coating. As such, one or more localized areas can achieve a select color. In such instances, the carrier medium inside the capsule, not the matrix between capsules, is cured. The method can be repeated for photonic crystals within the coating (like pixels) that requires the specified color. This process can be iterated through the total visible color range (changing the magnetic field each time). As such, a rapid pixel-by-pixel method can be used to make an image. The use of a UV laser defines the pixel size, in contrast to using the magnetic field, which is much more difficult to confine to a localized region.

This method can be digitally controlled and run by software, making it a quick, automated method for customized surfaces of substrates based on consumer preferences. It also holds a distinct advantage over traditional methods, such as digital printing, that have difficulty printing on 3-dimensional objects. By way of illustrative example, to customize the appearance of a substrate, a pattern, a drawing, a design, a photograph or any other pixelated image can be scanned into a computer. The computer then can control and operate the system to selectively apply the electromagnetic field (e.g. magnetic field, electric field) to create a mirror image of the scanned image and the laser to the photonic crystal coating to cure the photonic crystals and lock the scanned image. This customized printing process can be iterative, like dot-matrix printing, and can be done in a line-by-line, pixel-by-pixel sequence to create the selected pattern, a drawing, a design, a photograph or any other image. The customized printing of a pattern, a drawing, a design, a photograph or any pixelated image can be on the scale of a retina display. In other words, the customized printing process allows control of customizing the photonic crystal coating on the order of 300 pixels (e.g. photonic crystals) per inch.

Curing curable media at different locations on the surface at different times can control the color at the surface. For example, a first magnetic field associated with a first color (e.g. red) can be applied to change at least some of the photonic crystals in the coating to appear as the first color (e.g. red). In such instances, an electromagnetic field associated with red can be applied to at least a first portion of the photonic crystal coating. In response, the embedded particles will move into an ordered array having a uniform spacing or gap between adjacent particles that is ½λ of the wavelength associated with the color red (e.g. 650 nm). In other words, the gap is half of 650 nm (e.g. 325 nm). The carrier medium within capsules in the first portion can be cured to fix the particles within the capsules. Next, a second magnetic field associated with a second color (e.g. blue) can be applied to change at least some of the photonic crystals to appear as the second color (e.g. blue). In such instances, an electromagnetic field associated with the color blue can be applied to a second portion of the photonic crystal coating. In response, the embedded particles will move into an ordered array having a uniform spacing or gap between adjacent particles that is ½λ of the wavelength associated with the color blue. In other words, the gap is half of 490 nm (e.g. 245 nm). The carrier medium within capsules in the second portion can be cured to fix the particles within the capsules. This sequence can be repeated through the full spectrum of visible colors to create the selected colors, patterns, drawings, designs, photographs or any other image on a surface of the substrate as described herein. The electromagnetic field can be provided at different times to cure different portions of the surface and form different colors.

Figure 4A:
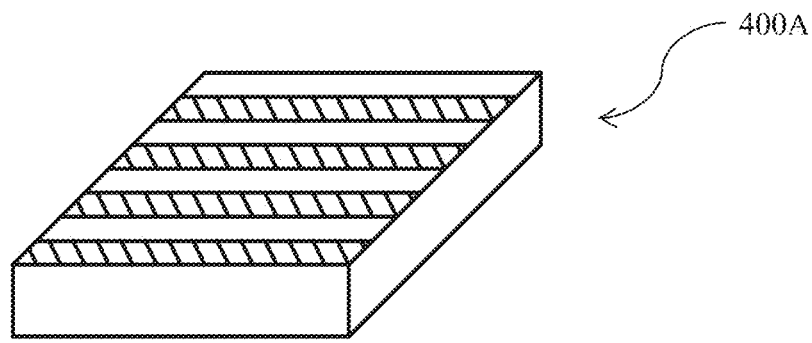
FIG. 4A shows a photonic crystal coating customized in a striped pattern, in accordance with embodiments of the disclosure.
Figure 4B:
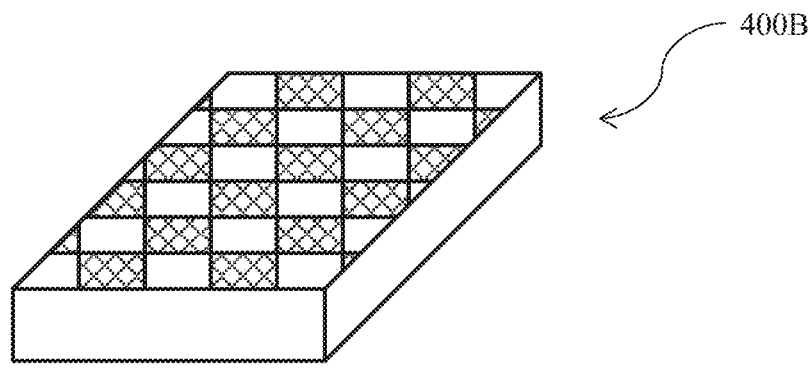
FIG. 4B shows photonic crystal coating customized in a checkered pattern, in accordance with embodiments of the disclosure.
Figure 4C:
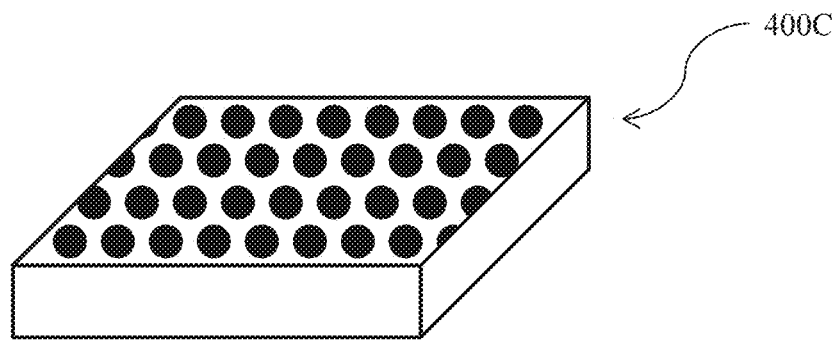
FIG. 4C shows a photonic crystal coating customized in a polka dotted pattern, in accordance with embodiments of the disclosure.
Figure 4D:
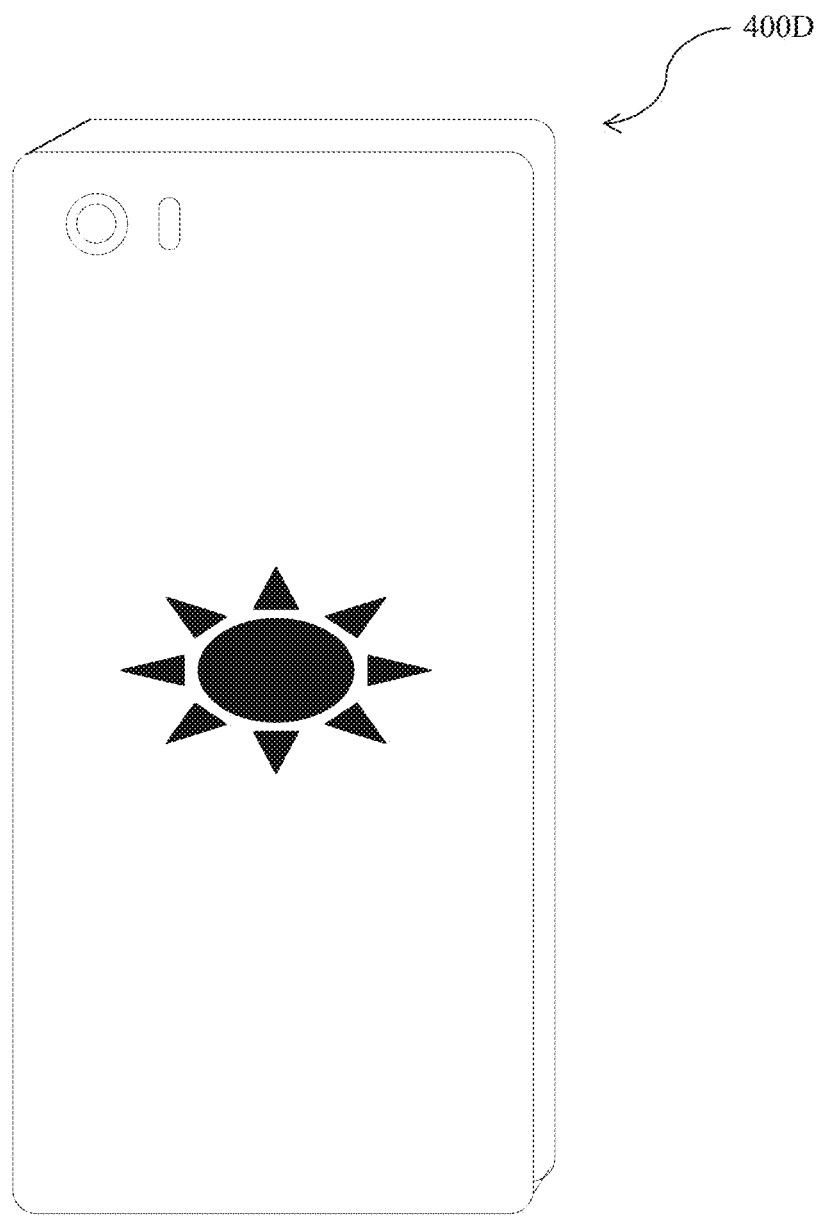
FIG. 4D show a photonic crystal coating customized with a drawing of sun, in accordance with embodiments of the disclosure.
Figure 5:
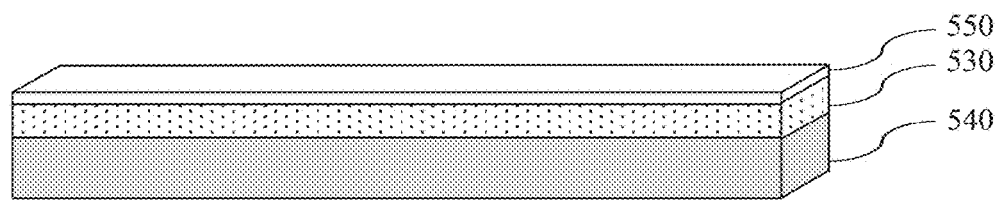
FIG. 5 shows an optional hard coat applied to a photonic crystal coating applied to a surface of a substrate, in accordance with embodiments of the disclosure.

As illustrated in FIGS. 4A-4D, any number of patterns, designs, drawings, photographs or any other pixelated image. In FIG. 4A, the photonic crystal coating 430A can be written to striped pattern on surface 400A. In FIG. 4B, the photonic crystal coating 430B can be written to create checkered pattern on surface 400B. In FIG. 4C, the photonic crystal coating 430C can be written to create a polka dot pattern on surface 400C. In FIG. 4D, the photonic crystal coating 430D can be written to create a drawing on surface 400D. It will be recognized to those skilled in the art that other patterns, designs, drawings, and images are possible. In some embodiments, an optional transparent or clear hard coat 550 can be applied to the photonic crystal coating 530 disposed on substrate 540 to enhance durability, as illustrated in FIG. 5. The hard coat can be applied to the photonic crystal coating before or after the printing process. For example, in some embodiments, a hardcoat of polyethylene terephthalate (PET), or cyclo-olefin polymer (COP), or other transparent material can be used. In other embodiments, a glass layer can be used as a hardcoat. In such embodiments, the glass layer may be applied to the photonic crystal coating before or after the printing process.

Methods of Forming a Static Appearance

In some embodiments, part (or all) of the photonic crystal coating can have a static visual appearance (i.e., once the surface of the substrate has been customized, the customization is retained). In such embodiments, the photonic crystal coating on the substrate can be customized through printing process described above to write a color, a pattern, a drawing, a design, a photograph or any other image on part of the substrate. In those regions, the photonic crystals can be cured with a laser or other heat source to lock the color pattern, a drawing, a design, a photograph or any other image, in accordance with embodiments described above.

Figure 6A:
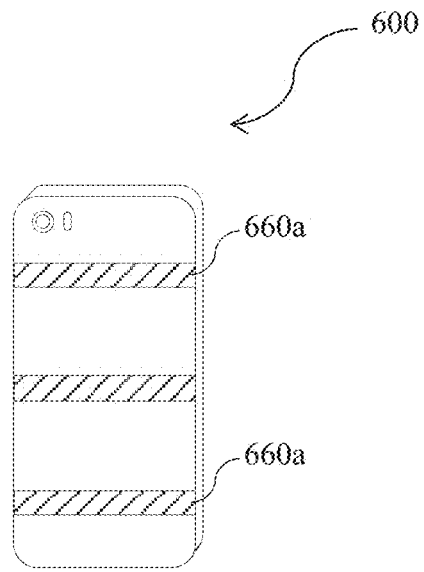
FIG. 6A shows a photonic crystal coating customized with a first color in a striped pattern, in accordance with embodiments of the disclosure.
Figure 6B:
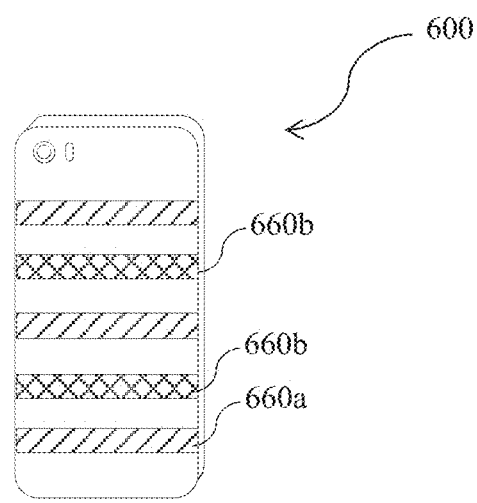
FIG. 6B shows a photonic crystal coating customized with a first color and a second color in a striped pattern, in accordance with embodiments of the disclosure.

For example, as illustrated in FIG. 6A, a first magnetic field associated with a first color (e.g. red) can be applied to change at least some of the photonic crystals in the coating to appear as the first color 660a (e.g. red), then a laser or heat source can be selectively applied to cure at least some of the photonic crystals to lock the first color (e.g. red). As depicted in FIG. 6A, the first portions of the photonic crystal coating associated with the first color are shown as stripes. This is for illustration only and not intended as limiting; other possible shapes, designs, patterns, etc. are within the scope of the disclosure. Next, as illustrated in FIG. 6B, a second magnetic field associated with a second color (e.g. blue) can be applied to change at least some of the photonic crystals to appear as the second color (e.g. blue) 660b, then a laser or other heat source can be selectively applied to cure at least the photonic crystals to lock the second color (e.g. blue). As depicted in FIG. 6A, the second portions of the photonic crystal coating associated with the second color are shown as stripes. This is for illustration only and not intended as limiting; other possible shapes, designs, patterns, etc. are within the scope of the disclosure. As illustrated in FIGS. 6A-6B, the printing process can be used to make a striped design with two colors. This is for illustration only, the sequence of applying an electromagnetic field associated with a particular color to a portion of the photonic crystal coating and curing the portion of the coating with a laser can be repeated through the full spectrum of visible colors to create the any number of selected colors, patterns, drawings, designs, photographs or any other image on a surface of the substrate.

Methods of Rewriting Appearance

In still other embodiments, it may be possible to erase the pattern, drawing, design, a photograph or any other image that was written to the photonic crystal coating. In such embodiments, the cured photonic crystal coating can be reheated so the curable material in the photonic crystals reflows and the embedded particles are again free to move within the capsules. As the particles move, the ordered arrangement diminishes and particles are randomized such that the photonic band gaps disappear. Then, if desired, the photonic crystal coating can be rewritten to apply a new color, pattern, design, drawing, photograph, or other image to the substrate using the printing method as described above. This has the advantage of allowing a customer to change the appearance of a product over time as the customer's preferences change.

Figure 7A:
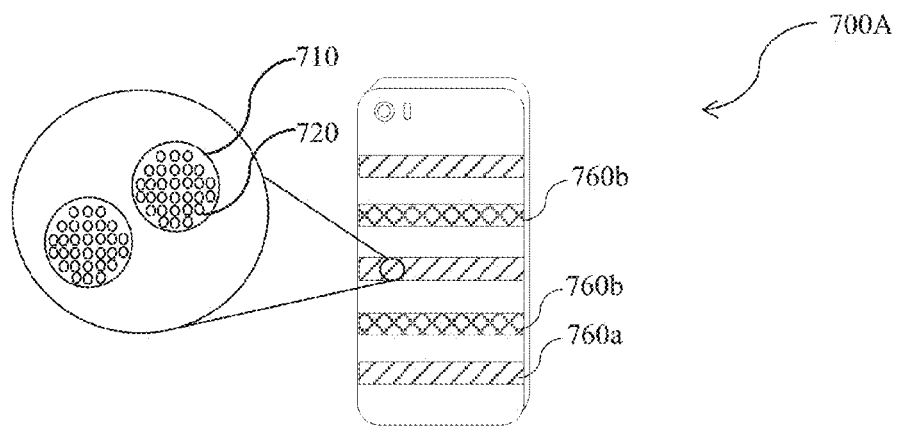
FIG. 7A shows a photonic crystal coating customized with a striped pattern having two colors, in accordance with embodiments of the disclosure.

For example, as illustrated in FIG. 7A, a photonic crystal coating 700A can be customize and have a design such as a two-color striped pattern. The striped patterned can have portions with a first colored portion 760a and portions with a second colored portion 760b that were customized based on a consumer's preference. As shown in the exposed-view insert of FIG. 7A, the colored portions 760a and 760b include capsules 710 with embedded particles 720 that can been aligned in an ordered array due to exposure to an electromagnetic field.

Figure 7B:
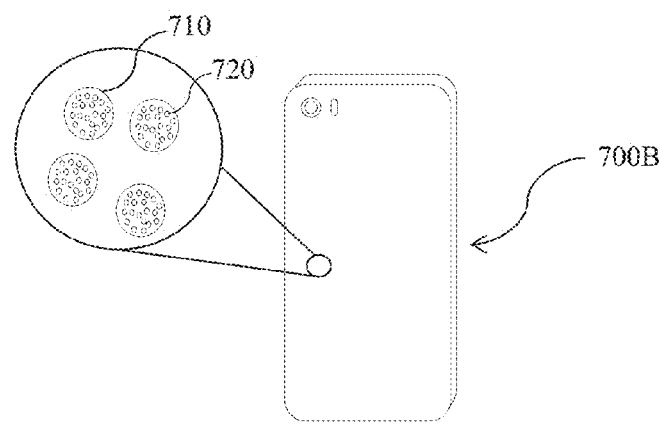
FIG. 7B shows the photonic crystal coating of FIG. 7A after heating to remove the customized striped pattern, in accordance with embodiments of the disclosure.

In some instances, a consumer may become tired of this two-color striped pattern of the photonic crystal coating 700A and want to change the design of the photonic crystal coating. In such cases, the photonic crystal coating 700A can be heated such that the cured material of the capsules reflows and the particles contained therein move out of the ordered array thereby causing the photonic crystal to revert back to an initial state and "erase" the customized design. As illustrated in FIG. 7B, the photonic crystal coating 700A has been heated and the customized design has been removed such that embedded particles 720 within capsules 710 are no longer in an ordered array, as shown in the exposed-view insert.

Figure 7C:
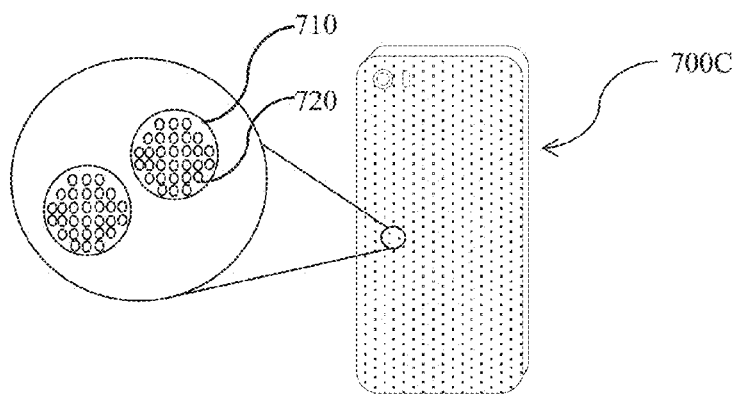
FIG. 7C shows the photonic crystal coating of FIG. 7B after exposure to an electromagnetic field to create a customized design, in accordance with embodiments of the disclosure.

Then, if desired, the photonic crystal coating can be rewritten to apply a new color, pattern, design, drawing, photograph, or other image to the substrate using the printing method as described above, as illustrated in FIG. 7C. By way of illustration, without intending to be limiting, the photonic crystal coating 700C has been selectively exposed to an electromagnetic field such that the embedded particles 720 of the capsules 710 (as shown in the exposed-view insert) become aligned in an ordered array again to create a polka-dot pattern. Other patterns, designs, drawings, pictures, or image can be created.

Dynamic Appearance

In some embodiments, the photonic crystal coating can remain uncured so they remain in a dynamic state and can be responsiveness to an electromagnetic field to act as a notification to alert an observer, in accordance with embodiments described above.

For example, the visual appearance of the substrate can be altered to act as alert or notification to an observer. The responsiveness of the photonic crystal coating to an electromagnetic field can cause a change in visual appearance (e.g. a color change) that can act as a notification to alert an observer. In such embodiments, the photonic crystal coating appears as a first color and a portion of the photonic crystal coating can be exposed to an electromagnetic field to cause the photonic crystal coating to appear as a second color in response to the electromagnetic field. Upon removing the electromagnetic field, the photonic crystal coating can revert back to the first color. For example, the surface the photonic crystal coating may initially appear blue and when exposed to electromagnetic field (e.g. an electric field or magnetic field), the surface can change to appear red to notify the observer.

Figure 8A:
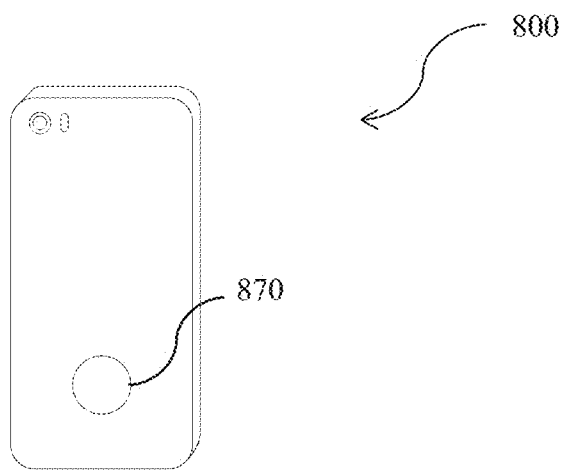
FIG. 8A shows a surface of a substrate with a dynamic photonic crystal portion having a first color for use as a notification, in accordance with embodiments of the disclosure.
Figure 9A:
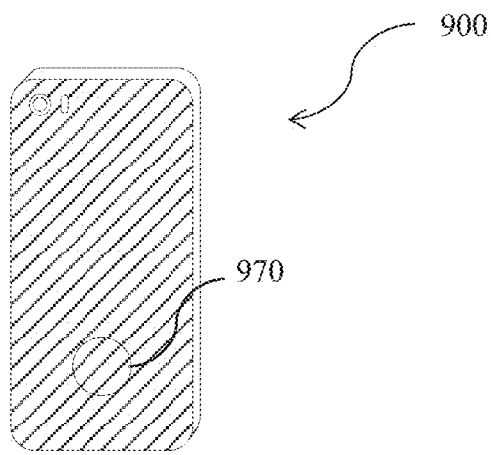
FIG. 9A shows a photonic crystal coating with a dynamic portion for use as a notification, in accordance with embodiments of the disclosure.

As illustrated in FIG. 8A, a surface of a substrate can be have dynamic photonic crystal portion 870. In a first state, the dynamic portion 870 may appear as the same color, pattern, design, etc. as the remainder of the surface. For example, as shown in FIG. 9A, the surface of the substrate 800 may be a first color and the dynamic portion 870 can appear as the same first color, such that the surface of the substrate, to which the dynamic photonic crystal portion is applied, has a uniform appearance. In some embodiments, to aid in color matching the dynamic portion 870 to the remainder of the surface of the substrate, pigments or dyes may be used in the dynamic portion. In other embodiments, the dynamic portion 870 can be a different color, pattern, design, drawings, etc. than the remainder of the surface of the substrate.

Figure 8B:
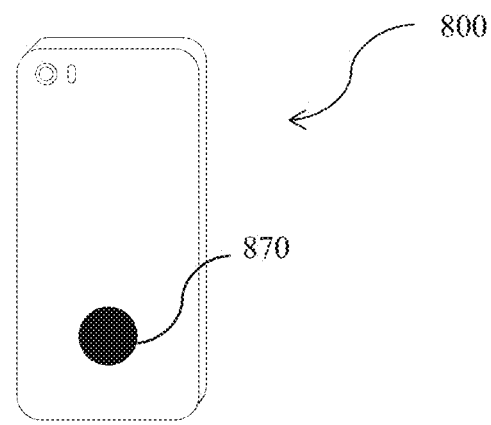
FIG. 8B shows the surface of a substrate with a dynamic photonic crystal portion as second color upon exposure to an electromagnetic field to act as an alert, in accordance with embodiments of the disclosure.
Figure 8C:
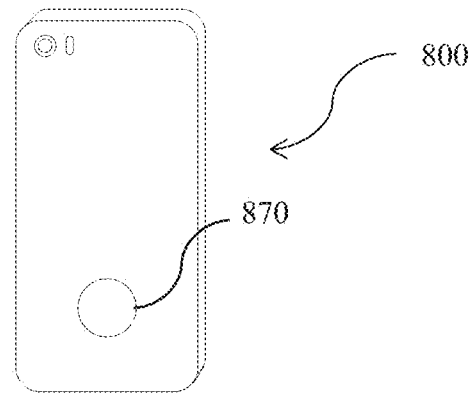
FIG. 8C shows the dynamic photonic crystal portion of the surface of the substrate of FIG. 8B reverting back to a first color upon removal of the electromagnetic field, in accordance with embodiments of the disclosure.

Upon application of an electromagnetic field, as shown in FIG. 8B, the dynamic photonic crystal portion can change to a second color to notify the observer. Because the dynamic photonic crystal portion 870 has not been cured, exposure to an electromagnetic field causes the embedded particles within the capsules within the dynamic photonic crystal portion 870 to move and align in an ordered array that is tune to the electromagnetic field, thereby causing the dynamic portion to appear as a second color in response to the electromagnetic field. When the electromagnetic field is removed, as shown in FIG. 8C, the dynamic photonic crystal portion 870 can revert back to its first color.

By illustrative example, without intending to be limiting, in some embodiments, the substrate can be a mobile phone that is designed with magnets that move or adjust their magnetic field when receiving or sending a signal, or in response to interaction with a user. For example, the photonic crystal coating can be applied to a housing or case for a mobile phone. In some embodiments, when a call, text, email or other message is received, a magnet could rotate internally on the phone, causing the photonic crystal coating to change color (e.g. have a rotating rainbow pattern as the magnet spins) so the observer is alerted that there is a call, text, email or other message. In such embodiments, the change in visual appearance can be the notification rather than a sound, a vibration, or a light.

In some embodiments, the surface of the substrate can have both static and dynamic portions. In such embodiments, part of the photonic crystal coating can be cured to have a static visual appearance while other parts can remain uncured so as to be dynamic. In such embodiments, the static portions of the photonic crystal coating on the surfaces of substrates can be customized through printing processes described above to write a color, a pattern, a drawing, a design, a photograph or any other pixelated image on part of the substrate. In those regions, the photonic crystals can be cured with a laser or other heat source to lock the color pattern, a drawing, a design, a photograph or any other pixelated image, in accordance with embodiments described above. While other dynamic portions of the photonic crystal coating can remain uncured so they remain in a dynamic state and can be responsiveness to an electromagnetic field to act as a notification to alert an observer, in accordance with embodiments described above.

As illustrated in FIG. 9A, a photonic crystal coating 900 can be have a dynamic portion 970. In a first state, the dynamic portion 970 may appear as the same color, pattern, design, etc. as the remainder of the photonic crystal coating 900. For example, as shown in FIG. 9A, the photonic crystal coating 900 may be a first color and the dynamic portion 970 can appear as the same first color, such that the surface of the substrate, to which the photonic crystal coating is applied, has a uniform appearance. In some embodiments, to aid in color matching the dynamic portion 970 to the remainder of the photonic crystal coating, pigments or dyes may be used in the dynamic portion. In other embodiments, the dynamic portion 970 can be a different color, pattern, design, drawings, etc. than the remainder of the photonic crystal color such that the surface of the substrate, to which the photonic crystal coating is applied, can be any combination of colors, patterns, designs, etc.

Figure 9B:
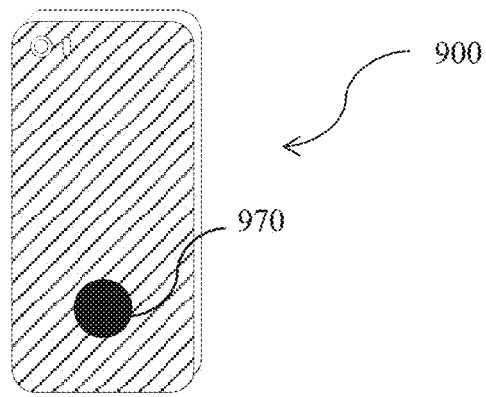
FIG. 9B shows the a dynamic portion of a photonic crystal coating as second color upon exposure to an electromagnetic field to act as an alert, in accordance with embodiments of the disclosure.
Figure 9C:
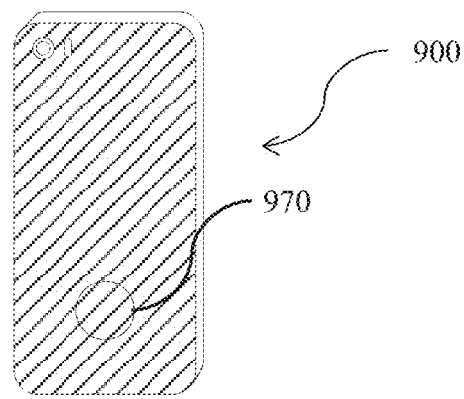
FIG. 9C shows the dynamic portion of a photonic crystal coating of FIG. 9B reverting back to a first color upon removal of the electromagnetic field, in accordance with embodiments of the disclosure.

Upon application of an electromagnetic field, as shown in FIG. 9B, the dynamic portion can change to a second color to notify the observer. Because the carrier medium contained in capsules in the dynamic portion 970 has not been cured, exposure to an electromagnetic field causes the embedded particles within the capsules within the dynamic portion 970 to move and align in an ordered array that is tune to the electromagnetic field. The dynamic portion then appears as a second color in response to the electromagnetic field. When the electromagnetic field is removed, as shown in FIG. 9C, the dynamic portion 970 can revert back to its first color.

In practice, the substrates with surfaces having a photonic crystal coating can be used on the visible surfaces of a wide variety of articles of manufacture. The surfaces having a photonic crystal coating can be the housings or casings of articles, where the visual appearance (color, design, picture, or image) can impact consumer selection. The articles can range in size from small personal electronic devices (e.g., smart watches, fitness trackers, cellphones, tablets, e-readers, laptops, etc.), and fashion items (e.g. footwear, hats, handbags, etc.) to large items (e.g. cars, trucks, boats, etc.). Other articles of manufacturing are possible.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A surface structure comprising:
    a substrate;
    a photonic crystal coating disposed on the substrate, the photonic crystal coating comprising capsules dispersed in a matrix material, each capsule comprising particles disposed in a medium; and
    wherein the particles are configured to align in an ordered array upon application of an electromagnetic field.

2. The surface structure of claim 1, wherein the substrate is a glass.

3. The surface structure of claim 1, wherein the substrate is a metal.

4. The surface structure of claim 1, where the substrate is a polymer.

5. The surface structure of claim 1, wherein the capsules have a first refractive index and the particles have a second refractive index, wherein the first refractive index is lower than the second refractive index.

6. The surface structure of claim 1, wherein the capsule is a glass.

7. The surface structure of claim 1, wherein the matrix material of the capsule comprises a polymer.

8. The surface structure of claim 1, wherein the particles are a magnetic material.

9. The surface structure of claim 1, wherein the particles are a ferro-electric material.

10. The surface structure of claim 1, wherein the particles are charged, magnetic, dielectric, or a combination thereof.

11. A method of creating a visual appearance on a surface of a substrate comprising:
    applying a photonic crystal coating to at least a portion of a surface of the substrate, the photonic crystal coating comprising capsules dispersed in a matrix material, each capsule comprising particles embedded in a curable carrier medium, the embedded particles configured to align in an ordered array upon application of an electromagnetic field;
    exposing at least a portion of the photonic crystal coating to the electromagnetic field to cause the particles to align in the ordered array such that the portion of the photonic crystal coating appears as a selected color; and
    curing the curable carrier medium in the capsules at the exposed portion of the photonic crystal coating to retain the selected color on the substrate after the electromagnetic field is removed.

12. The method of claim 11, wherein the electromagnetic field is a magnetic field.

13. The method of claim 11, wherein the electromagnetic field is an electric field.

14. The method of claim 11, wherein the curing comprising selectively applying a laser to the portion of the photonic crystal.

15. The method of claim 11, wherein the portion is a first portion, and further comprising
    exposing a second portion of the photonic crystal coating to a second electromagnetic field associated with a second color, and
    curing the carrier medium in the capsules at the exposed second portion to retain the second color after the second electromagnetic field is removed.

16. The method of claim 11, wherein the portion is a first portion, and further comprising:
    exposing a second portion of the photonic crystal coating to a second electromagnetic field associated with a second color prior to the curing step, wherein the curing step cures the carrier media in capsules in the second portion of the of the photonic crystal coating to retain the second color after the electromagnetic field is removed.

17. The method of claim 16, wherein the visual appearance is selected from a pattern, a design, a drawing, and a photograph.

18. The method of claim 11, where the surface of the substrate is selected from a housing, a casing, a frame, and a display.

19. A method of dynamically changing a visual appearance of a portion of a substrate comprising:

applying a photonic crystal coating to at least a portion of a surface of the substrate having a first color, the photonic crystal coating comprising capsules dispersed in a matrix material, each capsule comprising particles disposed in a medium, the particles configured to align in an ordered array upon application of an electromagnetic field;

exposing a portion of the photonic crystal coating to the electromagnetic field to cause the particles to align in the ordered array such that the photonic crystal coating appears as a second color; and removing the electromagnetic field to cause the particles to move out of the ordered array such that the photonic crystal coating appears as the first color.

20. The method of claim 19, wherein the electromagnetic field is a magnetic field.

* * * * *